US012801991B2

(12) United States Patent
Higa

(10) Patent No.: US 12,801,991 B2
(45) Date of Patent: Nov. 17, 2026

(54) CONTAINER LOADING MANAGEMENT SYSTEM AND CONTAINER LOADING MANAGEMENT METHOD

(71) Applicant: NEC Corporation, Tokyo (JP)

(72) Inventor: Ryota Higa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 617 days.

(21) Appl. No.: 18/276,781

(22) PCT Filed: Feb. 24, 2021

(86) PCT No.: PCT/JP2021/006861
§ 371 (c)(1),
(2) Date: Aug. 10, 2023

(87) PCT Pub. No.: WO2022/180679
PCT Pub. Date: Sep. 1, 2022

(65) Prior Publication Data
US 2024/0127115 A1 Apr. 18, 2024

(51) Int. Cl.
*G06N 20/00* (2019.01)
*B65G 67/04* (2006.01)

(52) U.S. Cl.
CPC ............. *G06N 20/00* (2019.01); *B65G 67/04* (2013.01)

(58) Field of Classification Search
CPC .......... G06N 20/00; G06N 5/01; B65G 67/04; B65G 61/00; B65G 63/00
See application file for complete search history.

(56) References Cited

U.S. PATENT DOCUMENTS

| | | | | |
|---|---|---|---|---|
| 2015/0294227 | A1* | 10/2015 | Digby-Jones | G06Q 10/04 706/47 |
| 2020/0149248 | A1* | 5/2020 | Ram-On | E01C 19/004 |
| 2020/0387166 | A1* | 12/2020 | Lacaze | G05D 1/0088 |

FOREIGN PATENT DOCUMENTS

| | | | |
|---|---|---|---|
| JP | 2000-076220 | A | 3/2000 |
| JP | 2005-075592 | A | 3/2005 |
| JP | 2016-088630 | A | 5/2016 |
| JP | 2019-104578 | A | 6/2019 |

OTHER PUBLICATIONS

International Search Report for PCT Application No. PCT/JP2021/006861, mailed on May 11, 2021.

(Continued)

*Primary Examiner* — Beemnet W Dada
(74) *Attorney, Agent, or Firm* — Sughrue Mion, PLLC

(57) ABSTRACT

The loading container information input means 71 accepts input of information on the target container. The Inquiring means 72 transmits current loading state and information on the target container to the container loading planning device 80 to inquire about the loading position of the target container. The evaluation means 73 outputs an evaluation value for loading the target container at the received loading position. The output means 74 outputs data including the loading state and information of the target container, the loading position of the target container, and the evaluation value as training data. The learning means 91 learns the model by machine learning using the output training data. The loading position determination means 81 determines the loading position of the target container using the learned model.

5 Claims, 14 Drawing Sheets

(56) References Cited

OTHER PUBLICATIONS

English translation of Written opinion for PCT Application No. PCT/JP2021/006861, mailed on May 11, 2021.
Toshiki Hanaoka, "Freight Railway Container Management System Using RFID," Journal of Electrical Installation Engineers of Japan, May 2008, vol. 28, Issue 5, pp. 311-315.

* cited by examiner

Dual Network $f_\theta(s) = (V_\theta(s), \pi_\theta(a|s))$

CONTAINER LOADING MANAGEMENT SYSTEM AND CONTAINER LOADING MANAGEMENT METHOD

TECHNICAL FIELD

This invention relates to a container loading management system and a container loading management method for managing containers to be loaded on freight cars.

BACKGROUND ART

In recent years, with the development of AI (Artificial Intelligence) and IoT (Internet of Things), the logistics industry has also been required to improve operational efficiency and automation. Rail cargo transportation is another form of transportation in the logistics industry, and the management of containers used for rail cargo transportation also requires greater efficiency.

An example of a system for managing containers is described in non-patent literature 1. The system described in non-patent literature 1 maneuvers and distributes containers appropriately by knowing the position of containers and other information in real time. The system described in non-patent literature 1 has an automatic slot adjustment function, which automatically reserves the earliest arriving train and changes the spare cargo to other trains whenever a new cargo order is received.

CITATION LIST

Non Patent Literature

NPL 1: Toshiki Hanaoka, "Freight Railway Container Management System Using RFID," Journal of Electrical Installation Engineers of Japan, 2008, Vol. 28, May, p. 311-315.

SUMMARY OF INVENTION

Technical Problem

On the other hand, the system described in non-patent literature 1 does not take into account constraints during loading, such as container loading balance. In addition, at actual loading sites, there are cases where changes in reservations, etc. may occur. However, the system described in non-patent literature 1 is a static system that does not consider sequential changes in the current situation, so it is unable to respond to such changes, and the system is corrected accordingly based on on-site judgment. Therefore, the loading efficiency differs depending on the skill level of the operator who is responsible for the response.

To address this problem, a model for determining the preferred loading position can be learned from past loading records and used in daily operations. However, since the preferred loading state change with the times, it is desirable to be able to review the contents of the model sequentially so that the accuracy of the model can be maintained. On the other hand, if the model is to be reviewed as needed to keep up with daily changes, there is a problem that the workload on engineers becomes large. Therefore, it is desirable to be able to maintain the accuracy of the model for determining the loading position while reducing the engineer's workload.

Therefore, it is an exemplary object of the present invention to provide a container loading management system, a container loading management method, and a container loading management program that can maintain accuracy of a model for determining a loading position while controlling a load on engineers.

Solution to Problem

A container loading management system according to the exemplary aspect of the present invention include: a container management device which manages a container to be loaded; a container loading planning device which replies to a loading position of the container in response to an inquiry; and a learning device which learns a model used by the container loading planning device to determine the loading position of the container, wherein the container management device includes: a loading container information input means which accepts input of information on the target container which is the container to be loaded next; an inquiring means which transmits current loading state and information on the target container to the container loading planning device to inquire about the loading position of the target container; an evaluation means which outputs an evaluation value for loading the target container at the loading position received from the container loading planning device; and an output means which outputs data including the loading state and information on the target container, the loading position of the target container, and the evaluation value as training data, wherein the learning device includes: a learning means which learns the model by machine learning using the output training data; and a model output means which outputs the learned model, and wherein the container loading planning device includes a loading position determination means which determines the loading position of the target container based on the loading state received from the container management device, wherein the loading position determination means determines the loading position of the target container using the output model.

A container loading management method according to the exemplary aspect of the present invention include: by a container management device which manages a container to be loaded, accepting input of information on the target container which is the container to be loaded next; by the container management device, transmitting current loading state and information on the target container to a container loading planning device which replies to a loading position of the container in response to an inquiry, and inquiring about the loading position of the target container; by the container loading planning device, determining the loading position of the target container based on the loading state received from the container management device; by the container management device, outputting an evaluation value for loading the target container at the loading position received from the container loading planning device; by the container management device, outputting data including the loading state and information on the target container, the loading position of the target container, and the evaluation value as training data; by a learning device which learns a model used by the container loading planning device to determine the loading position of the container, learning the model by machine learning using the output training data; by the learning device, outputting the learned model; and by the container loading planning device, determining the loading position of the target container using the output model.

Advantageous Effects of Invention

According to the present invention, it is possible to maintain accuracy of a model for determining a loading position while controlling a load on engineers.

DESCRIPTION OF EMBODIMENTS

Hereinafter, exemplary embodiments of the present invention will be explained with reference to the drawings.

Figure 1:
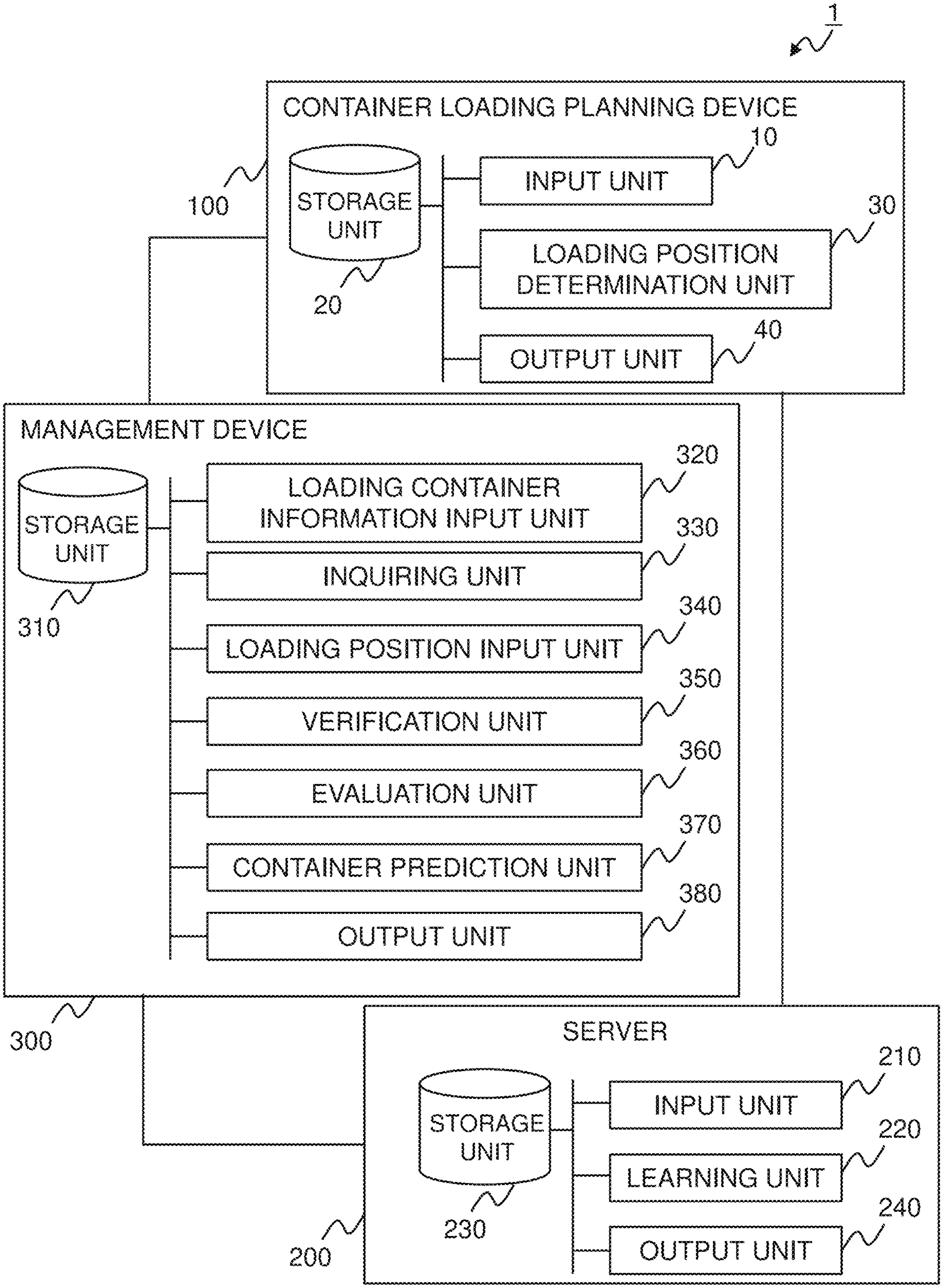
FIG. 1 It depicts a block diagram illustrating a configuration example of a container loading management system according to the present invention.

FIG. 1 is a block diagram illustrating a configuration example of a container loading management system according to the present invention. The container loading management system 1 of this exemplary embodiment includes a container loading planning device 100, a server 200, and a management device 300. The container loading planning device 100, the server 200, and the management device 300 are interconnected through communication lines.

The management device 300 is a device that manages information on containers to be loaded on freight cars. The container loading planning device 100 is a device that plans and replies to a loading position of the container in response to an inquiry from other devices (specifically, the management device 300). The server 200 is a device that learns a model (more specifically, a value function and a policy function) used by the container loading planning device 100 to determine the loading position of the container.

In this exemplary embodiment, the case in which the container loading planning device 100, the server 200, and the management device 300 are realized in separate devices is illustrated. However, these devices may be realized in one device, and the components of each device may be realized in different devices.

The management device 300 in this exemplary embodiment includes a storage unit 310, a loading container information input unit 320, an inquiring unit 330, a loading position input unit 340, a verification unit 350, an evaluation unit 360, a container prediction unit 370, and an output unit 380.

The storage unit 310 stores various types of information used by the management device 300 to perform processing. Specifically, the storage unit 310 stores information on freight cars that load containers (e.g., number of freight cars, size of freight cars, etc.) and constraints on loading containers. The storage unit 310 may also store other information such as the departure point and arrival point of the train loading the containers, a route and transit points, and weather conditions. These information may be expressed in any format, such as numerical data, image data, textual information, or vector-represented information. The storage unit 310 is realized by, for example, a magnetic disk.

The loading container information input unit 320 accepts input of information on the container to be loaded next (hereinafter sometimes referred to as "target container"). The container information to be input includes, for example, information indicating the container size (e.g., 12, 20, 31, 40 feet, etc.) and attributes (company name, whether or not cargo is loaded, loaded goods, arrival point, etc.). The loading container information input unit 320 may, for example, accept input of information on the next container to be loaded from an existing system, or may accept input by explicit user operation.

The loading container information input unit 320 may also accept input of the results of the arrival container prediction by the container prediction unit 370 described below. When subsequent processing is based on the prediction results, the management device 300 operates as a simulator that implements the processing based on the arrival prediction.

The inquiring unit 330 transmits information on the current loading state of the freight car and the container to be loaded next (i.e., the target container) to the container loading planning device 100 to inquire about the loading position of that container. In the following description, the information on the loading state and the target container at a certain time t is written as state $s_t$, and the loading position of the container specified in response to the inquiry may be written as $a_t$ (action $a_t$). In other words, the inquiring unit 330 transmits the state $s_t$ at time t to the container loading planning device 100 to inquire about the loading position $a_t$ of the container.

The loading state is information indicating the state in which containers are loaded on freight cars, specifically, which containers are loaded in which positions on which freight cars. The loading state may also include the container arrival prediction by the container prediction unit 370, which is described below.

If the container loading position $a_t$ is explicitly specified by the user, the inquiring unit 330 does not have to make an inquiry to the container loading planning device 100.

The loading position input unit 340 accepts input of the loading position of a container at a certain time t. The loading position input unit 340 may accept input of the loading position of the container from the container loading planning device 100, or may accept input of the loading position of the container from the user via a keyboard or touch panel.

The verification unit 350 verifies the validity of the accepted container loading position. Specifically, the verification unit 350 determines whether the accepted container loading position satisfies the constraints. The constraints are predetermined based on the freight car to be loaded, operational rules, time, safety, and other factors. Specifically, examples of constraints include whether it is physically possible to load, whether the vehicle as a whole is balanced, whether the operation rules for departure are followed, and so on.

If it is clear that the accepted container loading position satisfies the constraints, the verification unit 350 does not necessarily need to perform the process of verifying the validity of the container loading position. However, there is a possibility that it is unclear whether the accepted container loading position satisfies the constraints, for example, when input of the container loading position is accepted from the user. Therefore, by having the verification unit 350 verify the validity, inappropriate loading instructions can be suppressed.

The evaluation unit 360 outputs an evaluation value indicating the desirability of loading a container in the loading position. The method of calculating the evaluation value is arbitrary and is based on a predefined method. For example, the method of calculating the evaluation value may be defined in terms of efficiency, indicating that more containers were stacked, or in terms of profitability, indicating that more profitable containers were stacked. The verification unit 350 may, for example, output the evaluation value based on a value function stored in the storage unit 20 of the container loading planning device 100 (Equation 1 shown below), which will be described later.

More simply, the evaluation unit 360 may calculate the evaluation value to be higher the more valid the validity verification results are. Specifically, the evaluation unit 360 may output 1 as the evaluation value when the container is successfully loaded relative to the loading position, and may output 0 or −1 as the evaluation value when the loading fails. In addition, when the container loading position and the evaluation value when the container is loaded at the loading position are received from the container loading planning device 100, which will be described later, the evaluation unit 360 may output the received evaluation value.

The container prediction unit 370 predicts the arriving containers. The method by which the container prediction unit 370 predicts arriving containers is arbitrary, and generally known methods may be used. For example, the container prediction unit 370 may predict arriving containers by referring to past arrival history, or may predict arriving containers based on a prediction model that has been learned in advance.

The container prediction unit 370 may generate the same information as the container arrival prediction accepted by the input unit 10 of the container loading planning device 100, which will be described later. The contents of the container arrival prediction accepted by the input unit 10 are described below.

The output unit 380 outputs the loading position of the target container. At this time, the output unit 380 may output the loading position of the target container that the verification unit 350 determines to be reasonable. If the verification unit 350 determines that the loading position is not reasonable, the output unit 380 may output the reason why it is not reasonable (e.g., violation of constraint conditions, etc.) along with the loading position.

Furthermore, the output unit 380 may visualize the evaluation value output by the evaluation unit 360 in a time series corresponding to the loading of the target containers. When focusing on each train, the number of containers to be loaded increases cumulatively. Therefore, the output unit 380 may output the accumulated evaluation values for each train that loads containers in a time series, corresponding to the loading of the containers.

The output unit 380 may also output the container arrival predictions predicted by the container prediction unit 370 together with the target containers in the order of expected arrival. In doing so, the output unit 380 may output the containers with confirmed arrivals and the containers with undetermined arrivals (containers that are expected to arrive) in different ways. Specifically, the target container is the container whose arrival is confirmed, and the container whose arrival is undetermined is the container that is expected to arrive. Examples of screens output by the output unit 380 are described below.

Otherwise, the output unit 380 may generate data combining the state $s_t$ (i.e., information on the loading state and the target container), the received loading position $a_t$ of the target container, and the evaluation value for the received result as training data used by the learning unit 220 described below. This evaluation value may be an evaluation value calculated by the value function received from the container loading planning device 100 described below, or may be an evaluation value calculated by the evaluation unit 360. The output unit 380 then outputs the generated training data to the learner 220. The output unit 380 may sequentially output this training data to the server 200, or may store this training data in the storage unit 310 and periodically output it collectively to the server 200.

In FIG. 1, the container loading planning device 100 includes an input unit 10, a storage unit 20, a loading position determination unit 30, and an output unit 40.

The input unit 10 accepts input from the management device 300 of information on containers to be loaded (i.e., the target container) and the loading state of a freight car. As described above, the information of the container to be loaded is the information of the container to be loaded on the freight car, and includes, for example, the length of the container and whether it has cargo or not. The loading state of a freight car indicates, as described above, where the container is positioned on the entire freight car.

For simplicity of explanation, it is assumed three types of containers (12-foot containers, 20-foot containers, and 30-foot containers), each with or without cargo. The loading state of a freight car is identified below by the following numbers.

0: With no container in place
1: Placement of 12-foot container
2: Placement of empty 12-foot container
3: Placement of 20-foot container
4: Placement of empty 20-foot container
5: Placement of 30-foot container
6: Placement of empty 30-foot container Let N denote the loading position of each freight car and N' the number of the freight car, then the state set s is expressed as follows.

$$s \in \{0,1,2,3,4,5,6\}^{N \times N} \quad \text{[Math. 1]}$$

For example, if there are 5 different loading positions for freight cars and about 24-26 freight cars, the number of states would be $7^{130} \approx 10^{110}$. Even with this simplification, the number of combinations can be said to be enormous.

In addition, the input unit 10 accepts input of a container arrival prediction. The container arrival prediction is information indicating containers scheduled to arrive after the container to be loaded (including containers with confirmed arrivals). The container arrival prediction may include information on containers to be loaded.

The manner in which the container arrival prediction is represented is arbitrary. For example, the container arrival prediction may be information that represents the specific containers that are scheduled to arrive (to be loaded). Alternatively, the container arrival prediction may be information that allows sampling of containers from a predicted distribution of arrival probabilities (weights) for each container type.

For example, if s' is the state of the container scheduled to arrive, and number of h can be read ahead, the state $s_t'$ at time t can be expressed as follows. The following state $s_t'$ may be generated from the probability distribution $p_{\theta_b}(s')$ of container arrival predictions.

$$s_t' \in \{0,1,2,3,4,5,6\}^h$$

The storage unit 20 stores various information used by the loading position determination unit 30, described below, to determine the loading position of containers. In this exemplary embodiment, the storage unit 20 stores a policy function and a value function. The value function $V_\theta$ (s) is a function that calculates the value (evaluation value) for the loading state s of a freight car. For example, in the case of container loading, the value function can be defined as a function that calculates the ratio of the container loading capacity to the maximum loading capacity (length of the freight car).

Specifically, if the reward function for whether the loading was successful or not is $r_t \in \{0, 1\}$, the weight (container feet loaded) is $w_t \in \{12, 20, 30\}$, the number of loading positions is N (=5), and the number of freight cars is N' (=26), the value function $V_d(s)$ can be expressed in Equation 1 shown below. The value function may be defined as a simplified function that takes 1 if the loading is successful in the final state and 0 if the loading fails.

[Math. 2]

$$V_d(s) := \frac{\sum_{t=1}^{H} w_t r_t}{12 \times N \times N'} \quad \text{(Equation 1)}$$

The policy function $\pi$ $(a_t|s_t)$ is a function that calculates the selection probability (probability of the next action) of the container loading position assumed for the freight car loading state $s_t$. In the case of container loading, the selection made here is the action $a_t$ of sequentially placing containers among N×N' possible positions at time t.

Figure 2:
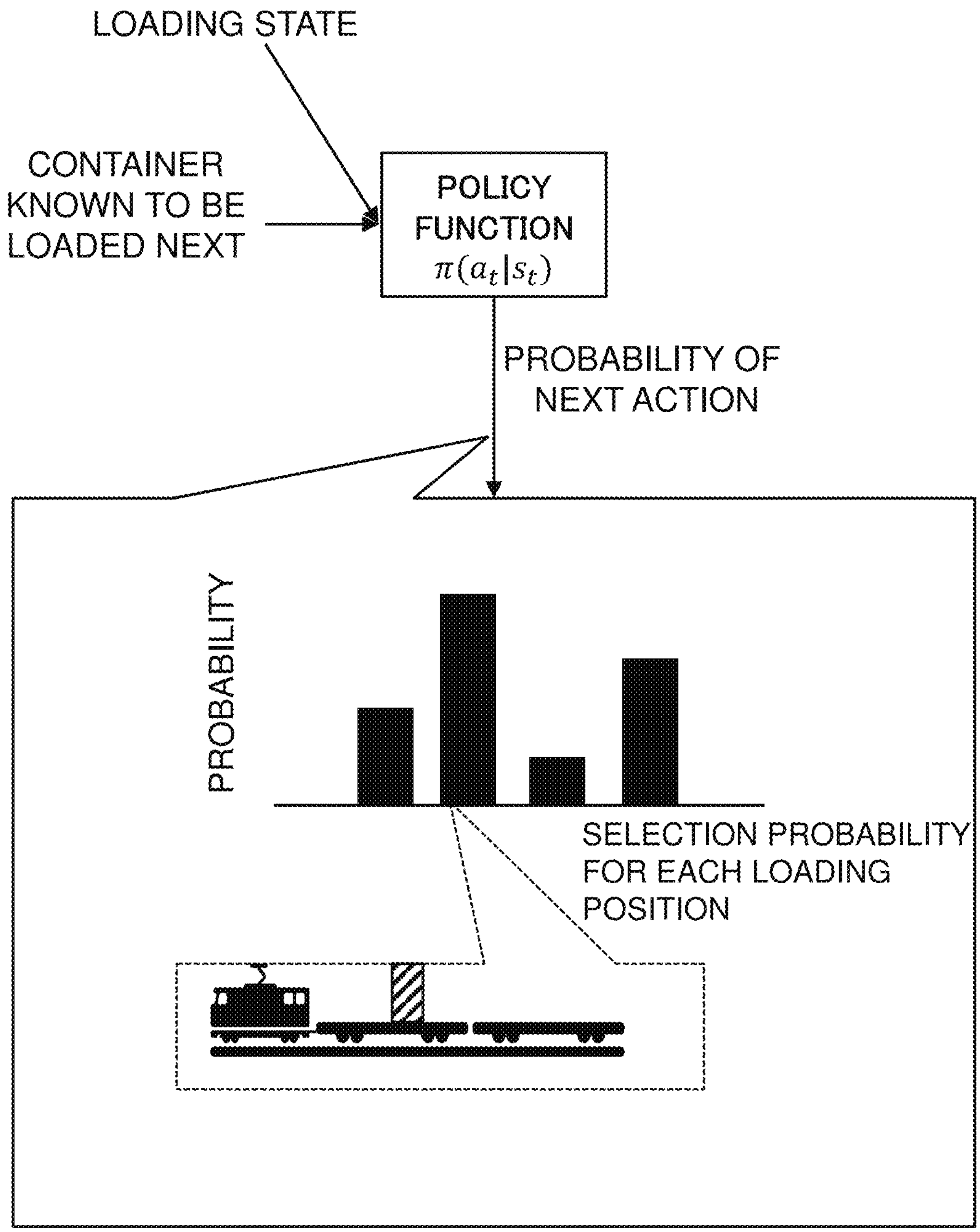
FIG. 2 It depicts an explanatory diagram illustrating an example of a policy function.

FIG. 2 is an explanatory diagram illustrating an example of a policy function. As illustrated in FIG. 2, the policy function $\pi$ $(a_t|s_t)$ outputs the probability of the next action (i.e., the probability of selecting each loading position in a given state s) with the loading state of the freight car and the known information of the next container to be loaded (container to be loaded) as inputs.

The policy function and the value function may be learned using training data indicating past loading records or loading plans. Here, the loading plan refers to information indicating the loading position of containers determined by the loading position determination unit 30, which is described below.

The learning method for the policy function and the value function is arbitrary. For example, the policy function and the value function may be learned using a learner that performs deep learning. In the example shown in FIG. 1, the policy function and the value function may be learned by the learning unit 220 of the server 200.

The loading position determination unit 30 determines the loading position of the container to be loaded in the freight car. Simply, the loading position determination unit 30 may determine the loading position based on predetermined rules (e.g., rule-based). The rules may include, for example, order from the front, giving priority to cars that are already loaded, giving priority to positions where it is easier to transport containers at each station, and so on.

In order to determine a more favorable loading position, the loading position determination unit 30 may determine the loading position of a container to be loaded on a freight car based on the policy function and the value function. In particular, this exemplary embodiment describes a case in which the loading position determination unit 30 determines the loading position of a container based on the value function calculated based on the container arrival prediction and the policy function.

Note that even if evaluation (optimization) is attempted for all possible branches based on the loading state of all freight cars, the number of combinations would be enormous, and it would be difficult to perform the process in real time. Therefore, in this exemplary embodiment, the loading position determination unit 30 uses Monte Carlo tree search to determine the loading position of containers in order to concentrate the search for effective moves through simulation.

Figure 3:
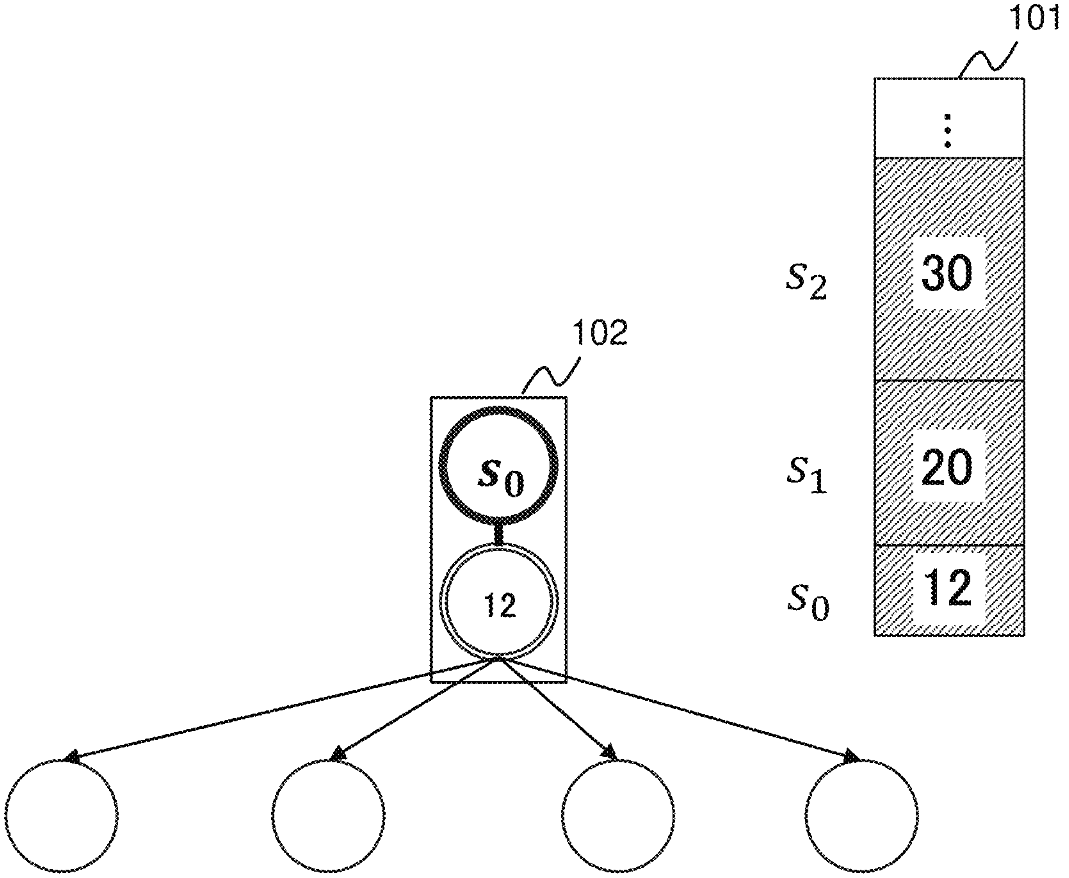
FIG. 3 It depicts an explanatory diagram illustrating an example of the process of determining the loading position of a container.

Here is a specific example of using Monte Carlo tree search to determine the loading position of a container. FIG. 3 is an explanatory diagram illustrating an example of the process of determining the loading position of a container. In this specific example, the initial state of the freight car is $s_0$, and the container states predicted thereafter are $s_1$, $s_2$ . . . . In the example shown in FIG. 3, based on the container arrival prediction 101, the container to be loaded in the initial state $s_0$ is a "12-foot container", the container expected to be loaded in the next state $s_1$ is a "20-foot container", and the container expected to be loaded in the next state $s_2$ is a "30-foot container".

Each node in the Monte Carlo tree corresponds to a loading position (i.e., which freight cars are loaded at which location). As illustrated in FIG. 3, in the initial state so, only the root node 102 exists. The loading position determination unit 30 determines the loading position of the container by repeating the trials in the order of arrival of the containers indicated by the container arrival prediction. In doing so, the loading position determination unit 30 repeats the trials to select the loading position of the container that maximizes the value of the selection criterion of the node in the Monte Carlo tree containing the value function and the policy function. Then, the loading position determination unit 30 determines the loading position indicated by the node with the highest number of trials as the loading position of the container.

This selection criterion is defined by considering the trade-off between the evaluation by look-ahead, which is based on the container arrival prediction, and the evaluation based on the probability of decision-making. Here, the probability of decision-making can be calculated based on the policy function, and the evaluation based on look-ahead can be calculated by the sum of the value functions calculated when following the look-ahead.

Therefore, the loading position determination unit 30 may repeat trials to select the node with the largest value of the selection criterion X (s, a) defined by Equation 2 below. In Equation 2, W (s) indicates the sum of the values of the value function $V_\theta$ (s) calculated at each node under the node, and N (s, a) indicates the number of times (number of trials) the node is selected. If the freight car to be selected is $a_1$ and the loading position of the freight car is $a_2$, the loading position a=($a_1$, $a_2$).

[Math. 3]

$$X(s, a) := \frac{W(s)}{N(s, a)} + c\pi_\theta(a|s)\frac{\sqrt{\sum_b N(s, b)}}{N(s, a) + 1} \quad \text{(Equation 2)}$$

The selection criterion illustrated in Equation 2 above can be said to be a criterion defined so that the value of the value function decreases as well as the value of the policy function for nodes with a higher number of trials.

Figure 4:
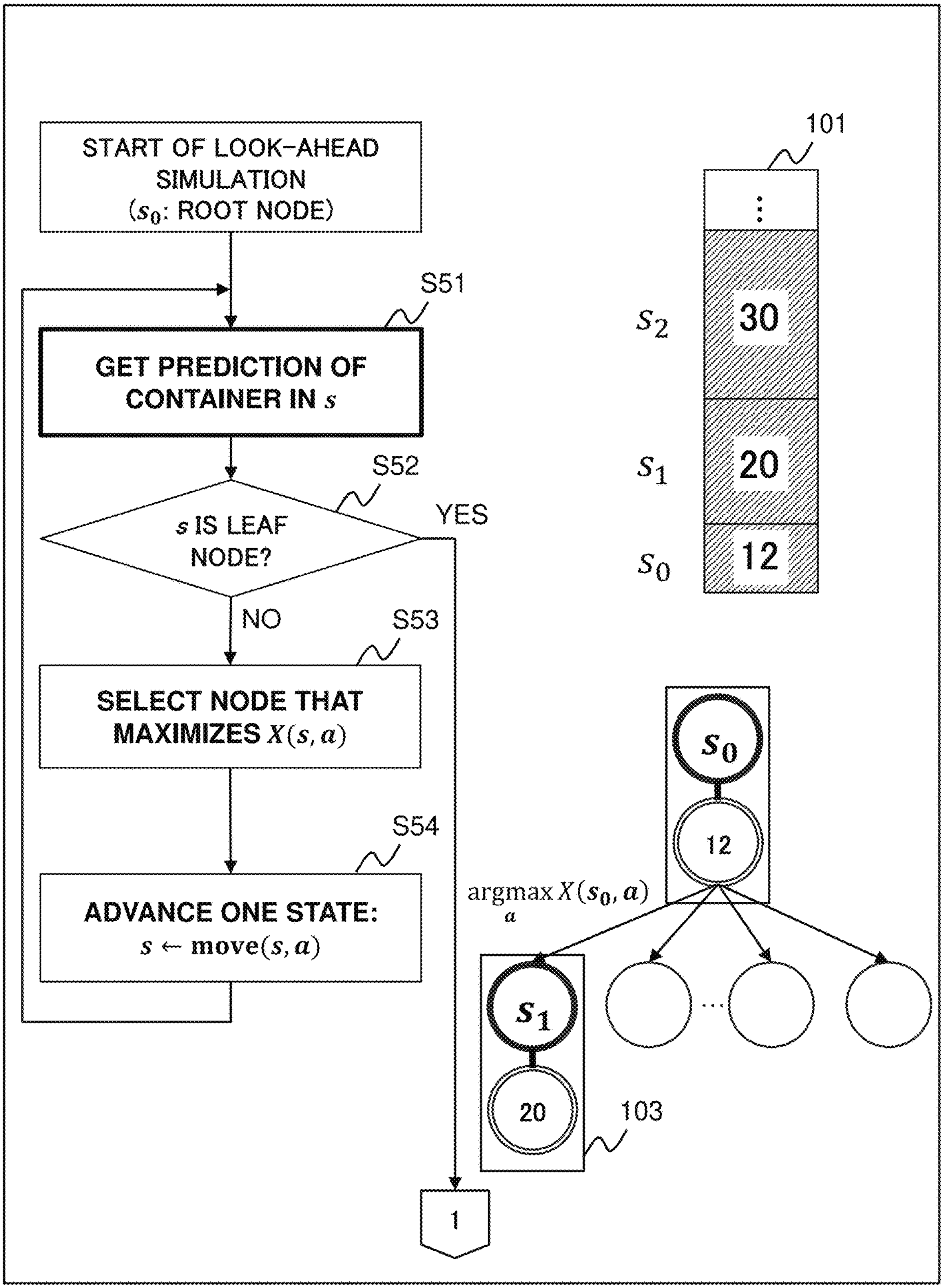
FIG. 4 It depicts an explanatory diagram illustrating an example of node selection by look-ahead.

The following is a specific description of the trials made based on the states illustrated in FIG. 3. FIG. 4 is an explanatory diagram illustrating an example of node selection by look-ahead. First, the loading position determination unit 30 obtains information on containers that are expected to be loaded in state s from the container arrival prediction (step S51). In the initial state $s_0$, the loading position determination unit 30 obtains information on the container (20-foot container) that is expected to be loaded in state $s_1$.

Next, the loading position determination unit 30 determines whether the current state s is a leaf node or not (step S52). Here, $s_0$ is not a leaf node (i.e., No in step S52), so it proceeds to step S53.

In step S53, the loading position determination unit 30 selects the node with the largest selection criterion X(s, a). In the initial state $s_0$, no node has yet made a trial, so in state $s_1$, the loading position 103 which is the first of the first freight car (a=(1, 1)) is selected. The loading position determination unit 30 then advances one state (step S54) and returns to the process of step S51.

The loading position determination unit 30 again obtains information on containers that are expected to be loaded in state s from the container arrival prediction (step S51). In state $s_1$, the loading position determination unit 30 obtains information on the container (30-foot container) that is expected to be loaded in state $s_2$.

Next, the loading position determination unit 30 determines whether the current state s is a leaf node or not (step S52). Here, $s_1$ is a leaf node (i.e., Yes in step S52), so the process proceeds to add a node.

Figure 5:
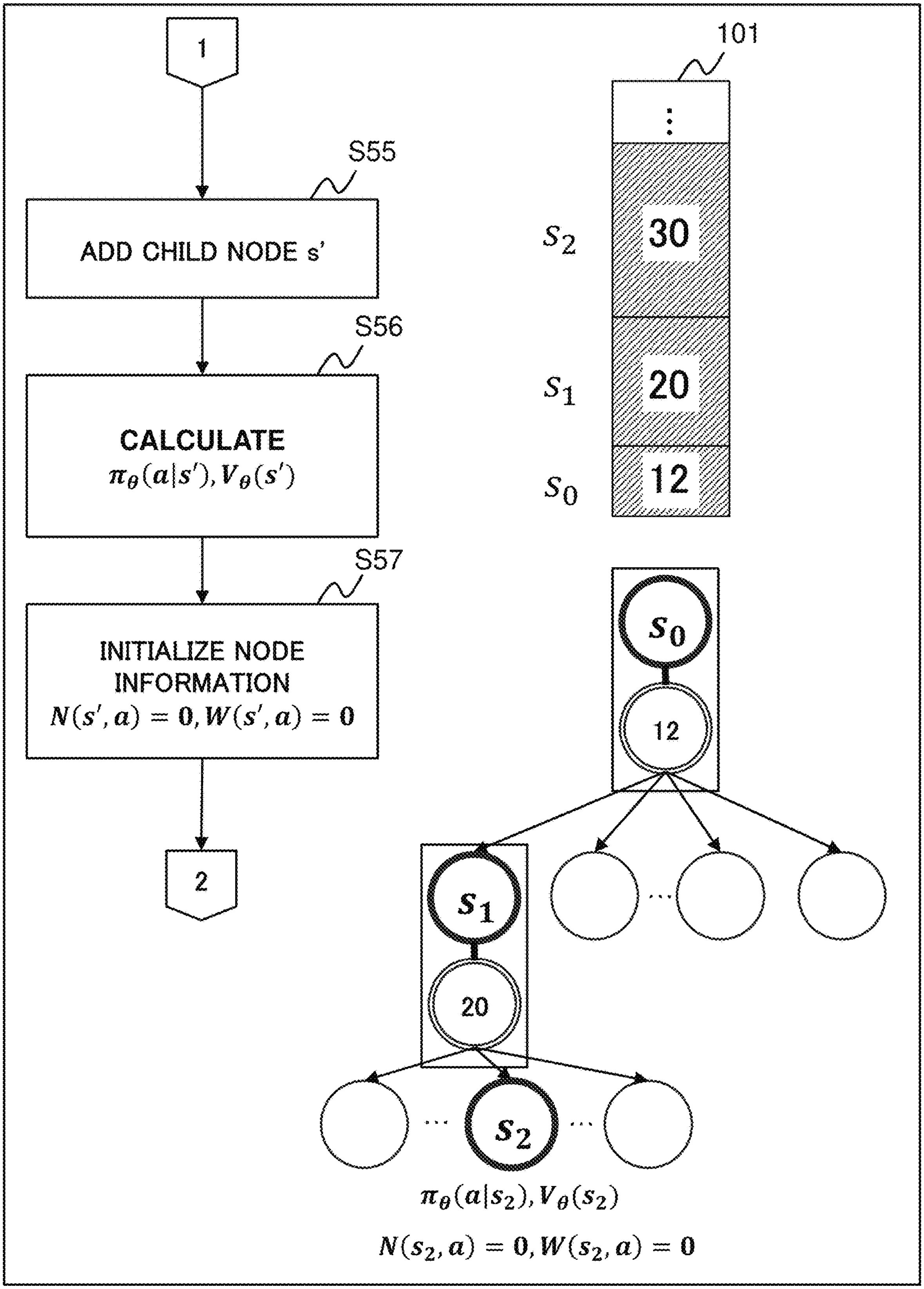
FIG. 5 It depicts an explanatory diagram illustrating an example of the process of adding a node.

FIG. 5 is an explanatory diagram illustrating an example of the process of adding a node. The loading position determination unit 30 adds a child node s' to the current node (step S55). Then, the loading position determination unit 30 calculates the value of the policy function ($\pi_\theta$ (a|s')) and the value function ($V_\theta$ (s')) for each candidate loading position for the state s' of the added child node (here, $s_2$) (step S56). The loading position determination unit 30 also initializes the information of each added node (step S57). That is, the loading position determination unit 30 sets N (s', a)=0 and W (s', a) for each loading position.

Figure 6:
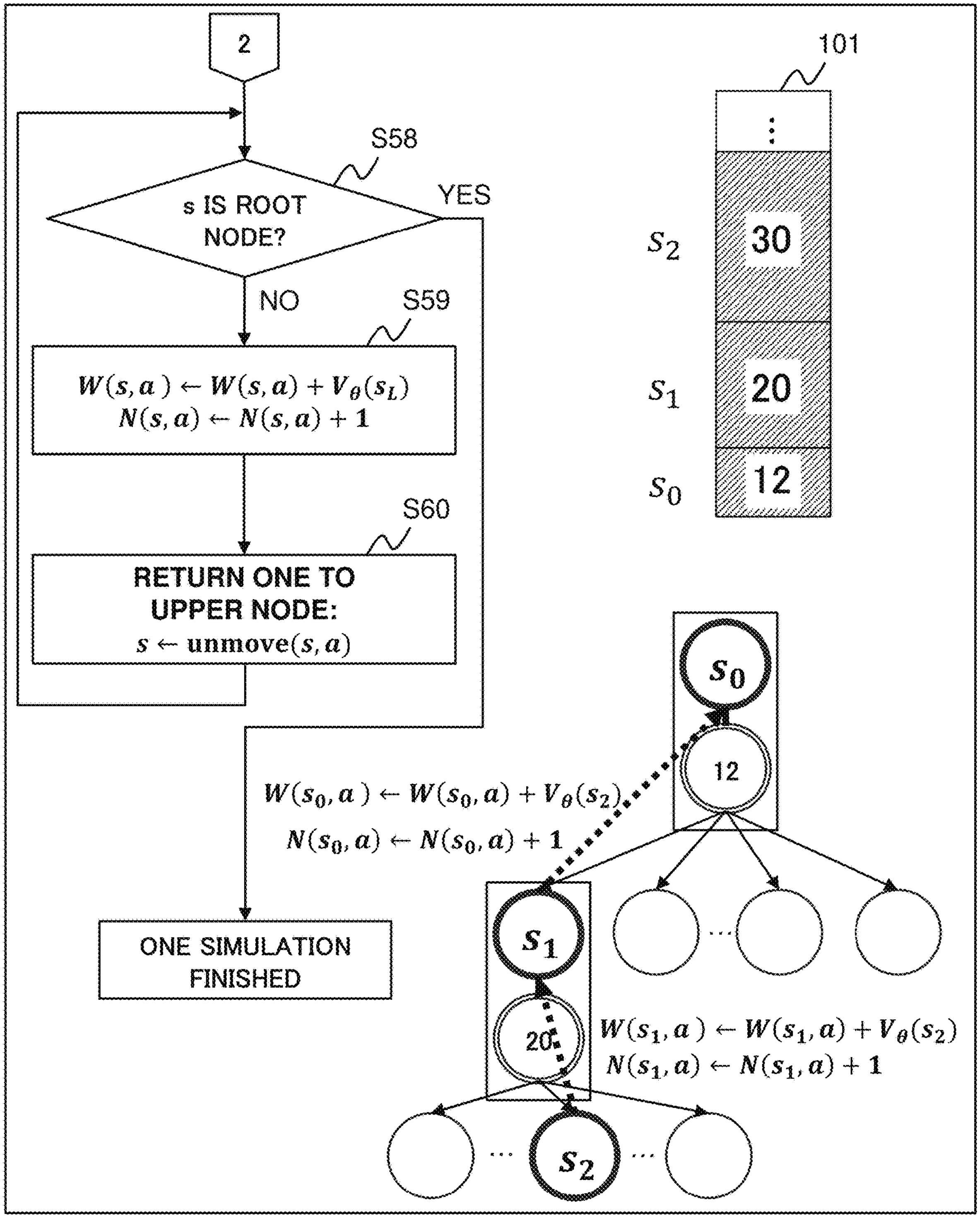
FIG. 6 It depicts an explanatory diagram illustrating an example of the process of calculating the sum of values calculated at each node.

FIG. 6 is an explanatory diagram illustrating an example of the process of calculating the sum of values calculated at each node under a node. The process illustrated in FIG. 6 shows the process of propagating the value function of the leaf node in reverse. First, the loading position determination unit 30 determines whether the current state s is a root node or not (step S58). Since state $s_2$ is not a root node (No in step S58), the process proceeds to step S59.

In step S59, the loading position determination unit 30 adds the value $s_L$ (here, $V_\theta$ ($s_2$)) of the value function calculated at the leaf node state (here, $s_2$) to the sum W (s, a) of the value function of the upper nodes (here, $s_1$) and updates the sum (here, W ($s_1$, a)). The loading position determination unit 30 also adds 1 to the selection count N (s, a) of the upper node (here, $s_1$) and updates the sum (here, N ($s_1$, a)) (step S59). The loading position determination unit 30 then returns the process to the upper node (step S60).

Thereafter, the process is repeated from step S58 onward. Specifically, the loading position determination unit 30 determines whether the current state s is a root node or not (Step S58). Since state $s_1$ is not a root node (No in step S58), the process proceeds to step S59.

In step S59, the loading position determination unit 30 adds the value $s_L$ (here, $V_\theta$ ($s_2$)) of the value function calculated at the leaf node state (here, $s_2$) to the sum W (s, a) of the value function of the upper nodes (here, $s_0$) and updates the sum (here, W ($s_0$, a)). The loading position determination unit 30 also adds 1 to the selection count N (s, a) of the upper node (here, $s_0$) and updates the sum (here, N ($s_0$, a)) (step S59). The loading position determination unit 30 then returns the process to the upper node (step S60).

Thereafter, the process is repeated from step S58 onward. Specifically, the loading position determination unit 30 determines whether the current state s is a root node or not (step S58). Since state $s_0$ is a root node (Yes in step S58), the process is terminated.

Figure 7:
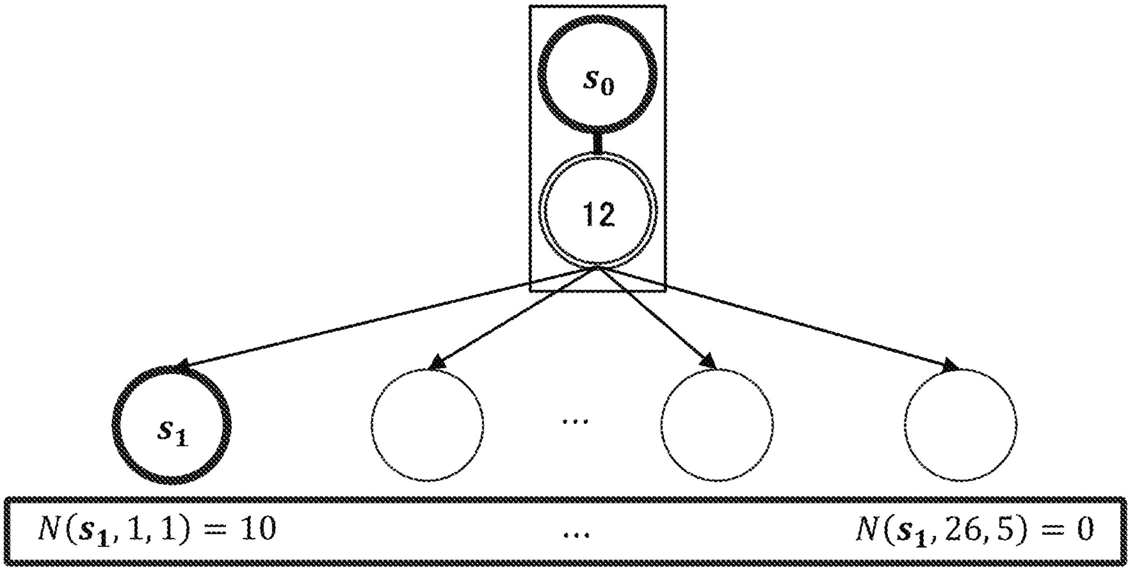
FIG. 7 It depicts an explanatory diagram illustrating an example of a result of a simulation run.

By running this simulation multiple times, the loading position determination unit 30 can obtain the number of trials N (s, a) for each node (loading position). FIG. 7 is an explanatory diagram illustrating an example of a result of a simulation run. The example shown in FIG. 7 indicates that the simulation was run 100 times, resulting in at least 10 trials for the first loading position (a=(1, 1)) of the first freight car.

The loading position determination unit 30 may also calculate the policy distribution using the Boltzmann distribution based on the trial results. Specifically, the loading position determination unit 30 may calculate the policy distribution based on Equation 3 shown below. In Equation 3, N(s, a) is the number of trials performed in state s, and β is inverse temperature. β may be set arbitrarily, and when determining the optimal loading position, $\beta^{-1}=0$ may be set. This corresponds to $\mathrm{argmax}_a\ \pi(a|s)$.

[Math. 4]

$$\pi_\beta(a|s) := \frac{N^\beta(s, a)}{\sum_{a'} N^\beta(s, a')} \quad \text{(Equation 3)}$$

When the number of simulations is L, the loading position determination unit 30 may calculate the policy distribution by considering the constraints illustrated in Equation 4 below.

[Math. 5]

$$\sum_a N(s_1, a) \le L \quad \text{(Equation 4)}$$

Figure 8:
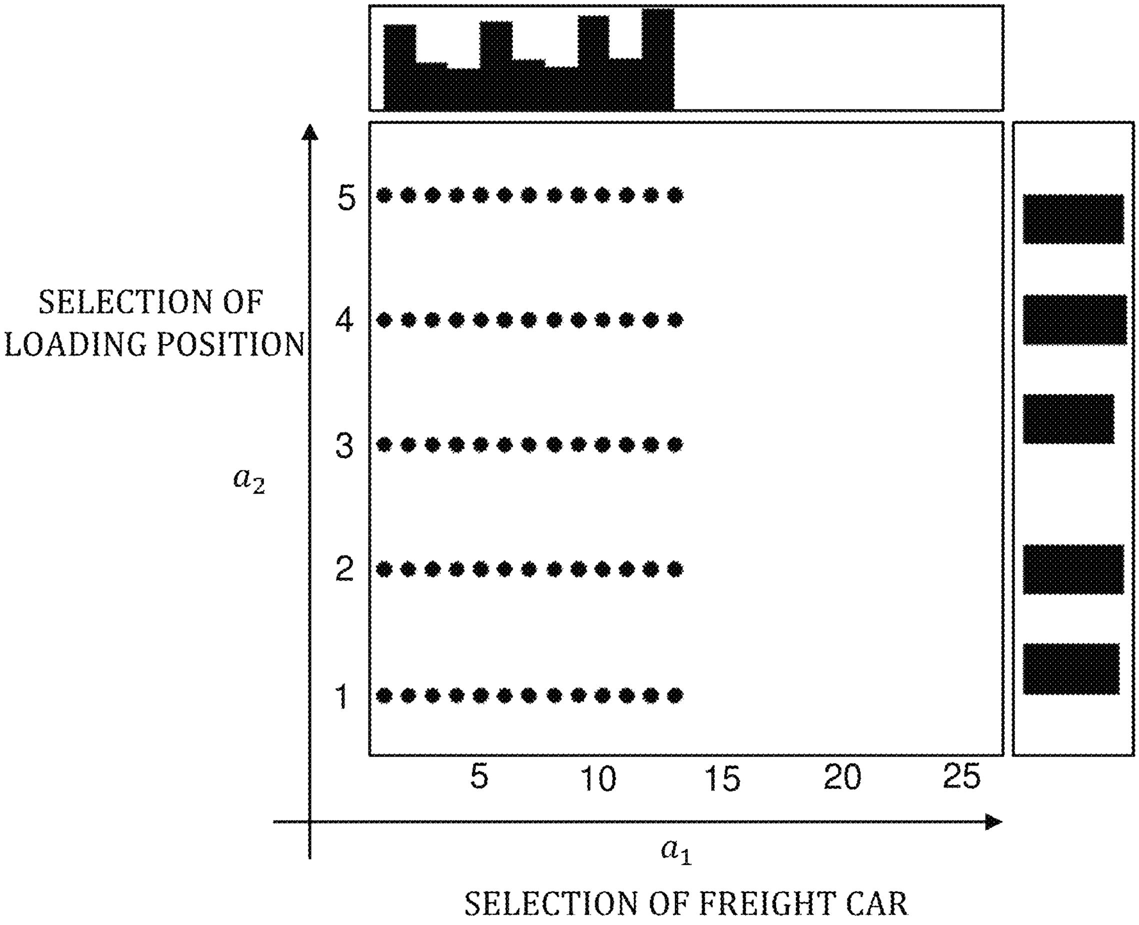
FIG. 8 It depicts an explanatory diagram illustrating an example of an output of trial results.

The output unit 40 outputs the determined loading position of the container. The output unit 40 may also output information about the freight cars and loading positions selected in the trial as trial results. FIG. 8 is an explanatory diagram illustrating an example of an output of trial results. The example shown in FIG. 8 shows a graph with the number of the selected freight car $a_1$ set on the horizontal axis and the selected loading position $a_2$ in the freight car set on the vertical axis. In the example shown in FIG. 8, the number of times selected for each freight car and the number of times selected for each loading position are shown as bar graphs in the upper part of the graph and in the right part of the graph, respectively, and the selected loading positions are indicated by circles in the graph.

The input unit 10, the loading position determination unit 30, and the output unit 40 are realized by a processor (for example, CPU (Central Processing Unit), GPU (Graphics Processing Unit)) of a computer that operates according to a program (a container loading planning program). The storage unit 20 is realized by, for example, a magnetic disk.

For example, a program may be stored in the storage unit 20 provided by the container loading planning device 100, and the processor may read the program and operate as the input unit 10, the loading position determination unit 30, and the output unit 40 according to the program. In addition, the functions of the container loading planning device 100 may be provided in the form of SaaS (Software as a Service).

The input unit 10, the loading position determination unit 30, and the output unit 40 may each be realized by dedicated hardware. Some or all of the components of each device may be realized by general-purpose or dedicated circuit, a processor, or combinations thereof. These may be configured by a single chip or by multiple chips connected through a bus. Some or all of the components of each device may be realized by a combination of the above-mentioned circuit, etc., and a program.

When some or all of the components of the container loading planning device 100 are realized by multiple information processing devices, circuits, etc., the multiple information processing devices, circuits, etc. may be centrally located or distributed. For example, the information processing devices, circuits, etc. may be realized as a client-server system, a cloud computing system, etc., each of which is connected through a communication network.

The loading container information input unit 320, the inquiring unit 330, the loading position input unit 340, the verification unit 350, the evaluation unit 360, the container prediction unit 370, and the output unit 380 of the management device 300 that makes inquiries to the container loading planning device 100 are also realized by a computer processor that operates according to a program (a management program).

In FIG. 1, the server 200 is a device for learning the value function and the policy function, as described above, and includes an input unit 210, a learning unit 220, a storage unit 230, and an output unit 240.

The input unit 210 accepts input of training data indicating past loading results or loading plans to be used for learning. The input unit 210 may also store the accepted training data in the storage unit 230.

The input unit 210 may also accept input of training data from the management device 300 (more specifically, the output unit 380). Specifically, the input unit 210 may accept inputs of training data sequentially or periodically from the management device 300, as described above.

The learning unit 220 learns a model representing the value function and the policy function by machine learning using the accepted training data. The learning method used by the learning unit 220 is arbitrary. For example, the value function and the policy function may be learned by widely known deep learning.

The timing at which the learning unit 220 performs learning is also arbitrary. For example, the learning unit 220 may receive the training data accumulated during work hours from the management device 300 collectively outside of work hours and perform the learning process using the received training data. However, the receipt of the training data and the learning process need not be synchronized.

Thus, the learning unit 220 learns the value function and the policy function based on training data generated based on information obtained during operation, enabling the container loading planning device 100 to determine the container loading position in accordance with the current situation.

Figure 9:
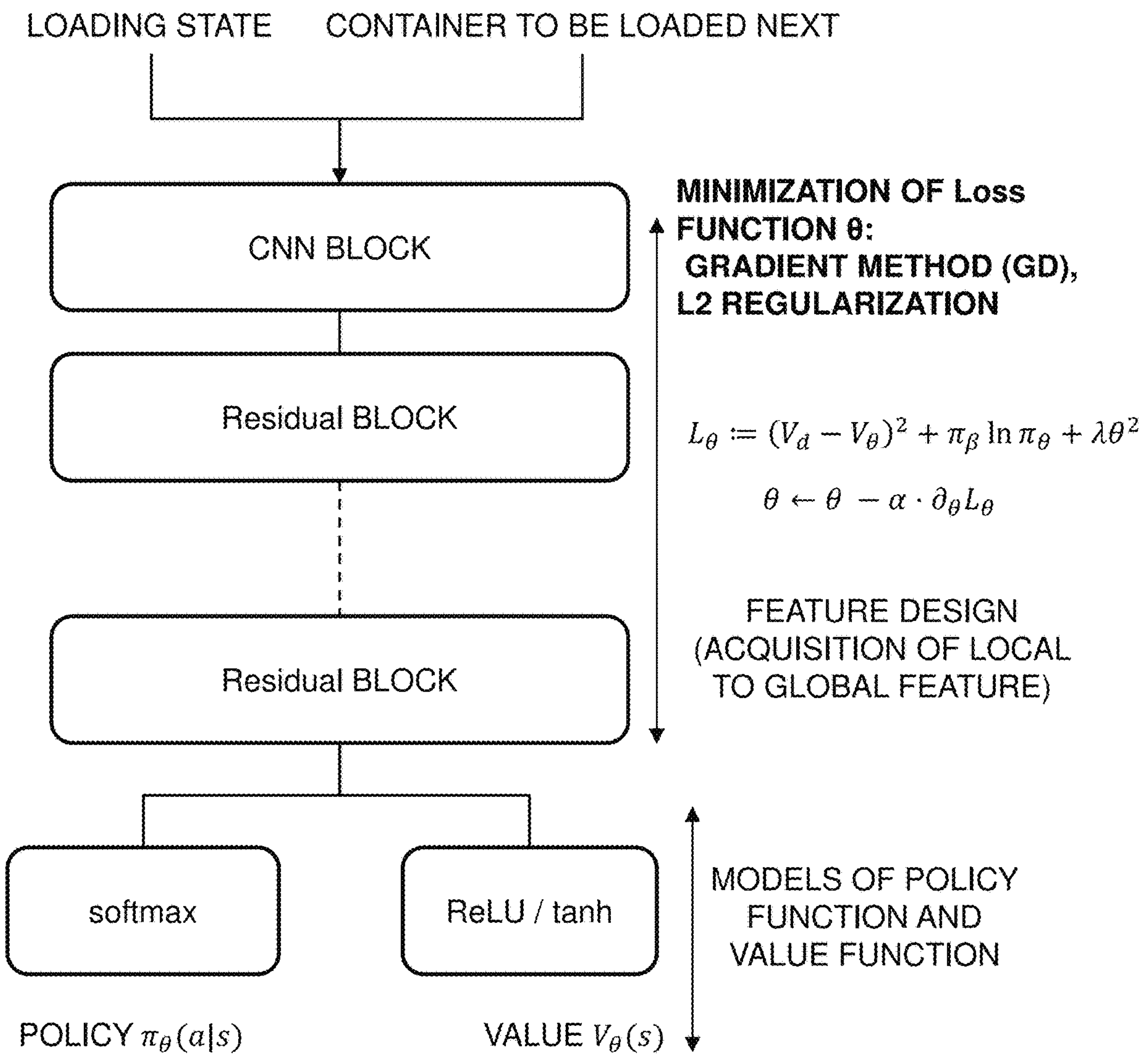
FIG. 9 It depicts an explanatory diagram illustrating an example of a deep learning model that represents a value function and a policy function.

The following is an example of how the learning unit 220 learns the value function and the policy function through deep learning. FIG. 9 is an explanatory diagram illustrating an example of a deep learning model that represents a value function and a policy function.

The deep learning model illustrated in FIG. 9 is a dual-network model $f_\theta(s)=(\pi_\theta(a|s), V_\theta(s))$, where the loading state and the next container to be loaded (i.e., the target container) are input layers and the model indicating the policy function $\pi_\theta(a|s)$ and the value function $V_\theta(s)$ is output layer. The intermediate layer has a function of performing feature design by having a structure in which the CNN (Convolutional Neural Network) block and the Residual block are repeated enough to cover the whole. In order to minimize the loss function θ, the learning unit 220 performs the update process by the gradient method (GD: Gradient Descent) and L2 regularization according to Equation 5 illustrated below.

[Math. 6]

$$L_\theta := (V_d - V_\theta)^2 + \pi_\beta \ln \pi_\theta + \lambda\theta^2$$

$$\theta \leftarrow \theta - \alpha \cdot \partial_\theta L_\theta \qquad \text{(Equation 5)}$$

The storage unit 230 stores the generated value function and policy function. Specifically, the storage unit 230 may store the deep learning model illustrated in FIG. 9 as the value function and the policy function. The storage unit 230 may also store accepted training data. The storage unit 230 is realized by, for example, a magnetic disk.

The output unit 240 outputs the generated function value and policy function. Specifically, the output unit 240 may output the parameters of the deep learning model illustrated in FIG. 9 that has been trained. The output unit 240 may, for example, transmit the generated value function and policy function to the container loading planning device 100 for storage in the storage unit 20. In this case, the loading position determination unit 30 may determine the loading position of the target container using the model to which the output parameters are applied.

The output unit 240 may transmit the value function and the policy function generated at predetermined times (e.g., once a day, before the start of operations, etc.) to the container loading planning device 100 to update the contents (parameters) of these functions.

The input unit 210, the learning unit 220, and the output unit 240 are realized by a computer processor that operates according to a program (learning program).

Next, the operation of the container loading management system of this exemplary embodiment will be described.

Figure 10:
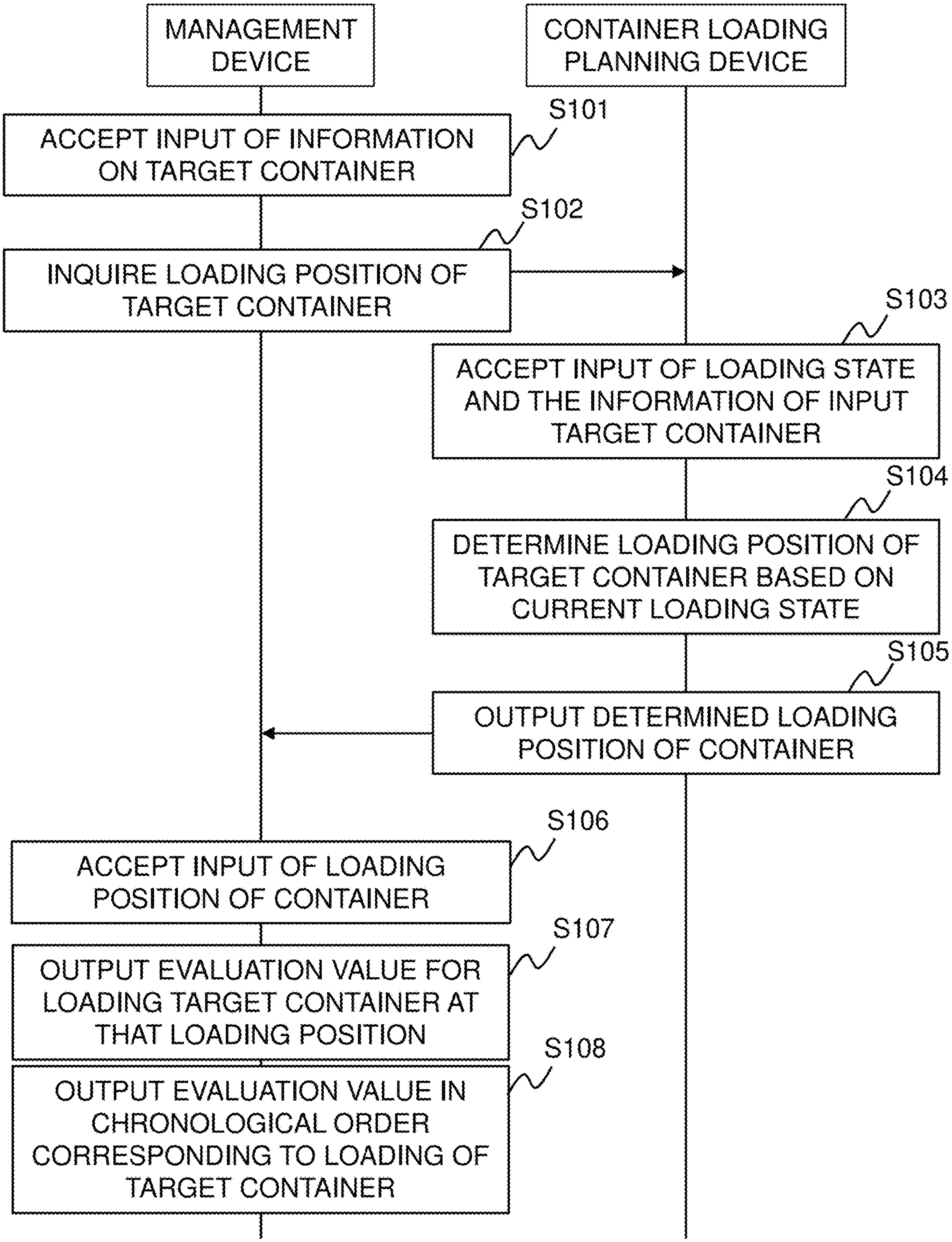
FIG. 10 It depicts an explanatory diagram illustrating an example of the operation of the container loading management system.

First of all, the operation of the container loading management system 1 when it is used by workers and others in an actual container loading situation is explained. FIG. 10 is an explanatory diagram illustrating an example of the operation of the container loading management system 1 of this exemplary embodiment.

The loading container information input unit 320 of the management device 300 accepts input of information on the target container (step S101). The inquiring unit 330 transmits the current loading state and the inputted information of the target container to the container loading planning device 100 to inquire the loading position of the target container (step S102).

The input unit 10 of the container loading planning device 100 accepts input from the management device 300 of the loading state and the information of the input target container (step S103). The loading position determination unit 30 determines the loading position of the target container based on the current loading state (step S104). The output unit 40 then outputs the determined loading position of the container to the management device 300 (step S105). The output unit 40 may also output the evaluation value for the determined loading position of the container to the management device 300.

The loading position input unit 340 of management device 300 accepts the input of the loading position of the container from the management device 300 (step S106). The verification unit 350 may verify the validity of the accepted container loading position. The evaluation unit 360 outputs the evaluation value for loading the target container at that loading position (step S107). Then, the output unit 380 outputs the evaluation values in chronological order corresponding to the loading of the target container (step S108).

Figure 11:
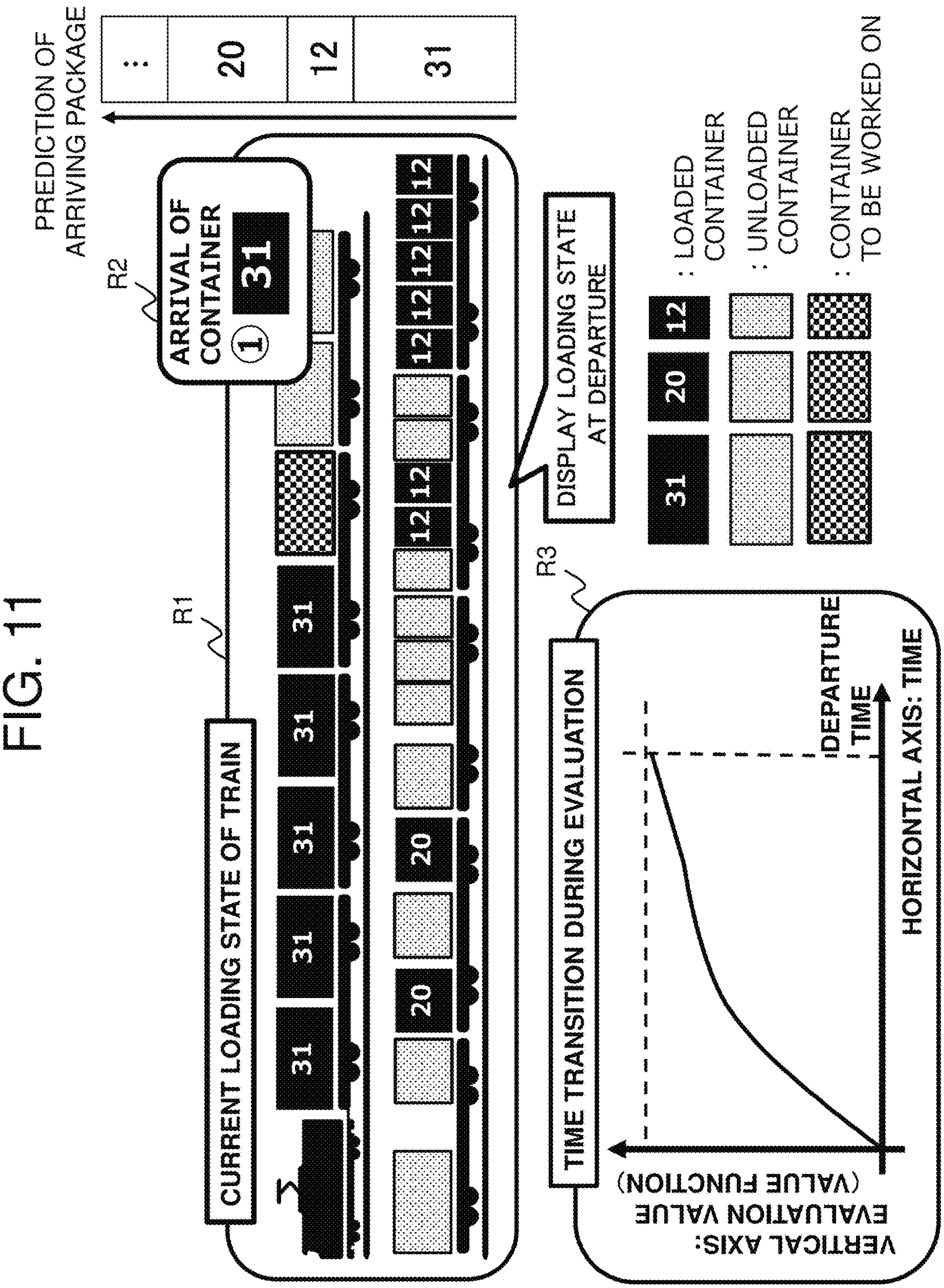
FIG. 11 It depicts an explanatory diagram illustrating an example of a screen that visualizes the loading state of a container.

FIG. 11 is an explanatory diagram illustrating an example of a screen that visualizes the loading state of a container. The area R1 illustrated in FIG. 11 is a screen showing the current loading state of the train (more specifically, the loading state at departure), and is mainly referred to by operators and managers. In addition, area R2 above area R1 shows information on the container scheduled to arrive next (i.e., the target container).

And area R3 is a screen that outputs the evaluation values in chronological order corresponding to the loading of the target container, and is mainly referred to by the administrator. The output unit 40 may output the evaluation values accumulated chronologically in response to the loading of the target container, as illustrated in FIG. 11. In the example shown in FIG. 11, the containers are described in black-and-white binary values, but each container may be displayed in a different color for each type.

Figure 12:
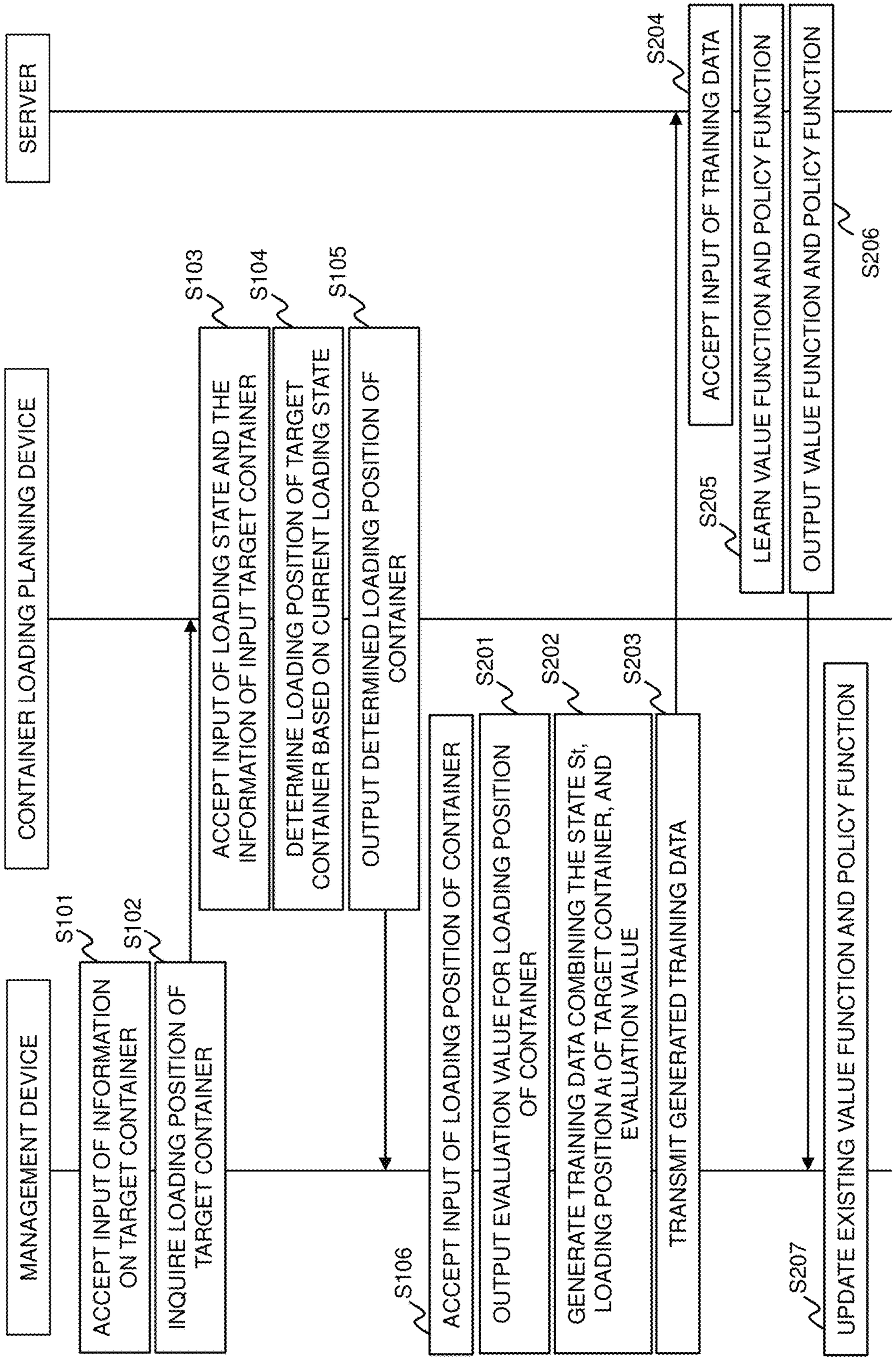
FIG. 12 It depicts an explanatory diagram illustrating another example of the operation of the container loading management system.

Next, the operation of the container loading management system 1 when it learns a model during container loading operations is described. FIG. 12 is an explanatory diagram illustrating another example of the operation of the container loading management system 1 of this exemplary embodiment. The process until the management device 300 transmits the accepted target container information and loading state to the container loading planning device 100 and receives the input of the container loading position is the same as the process from step S101 to step S106 in FIG. 10. The verification unit 350 may perform the process of step S107 in FIG. 10 to verify the validity of the accepted container loading position.

The evaluation unit 360 outputs the evaluation value for the loading position of the container (step S201). The output unit 380 generates training data combining the state $s_t$ (i.e., information on the loading state and the target container), the received loading position $a_t$ of the target container, and the evaluation value (step S202). The output unit 380 then transmits the generated training data to the server 200 (step S203).

The input unit 210 of the server 200 accepts input of the training data (step S204). The learning unit 220 learns the value function and the policy function by machine learning using the accepted training data (step S205). The output unit 240 outputs the generated value function and policy function to the container loading planning device 100 (step S206).

The container loading planning device 100 updates the existing value function and policy function with the value function and policy function transmitted from the server 200 (step S207). Thereafter, the updated value function and policy function are used to determine the loading position of the target container.

As described above, in this exemplary embodiment, the loading container information input unit 320 of the management device 300 accepts input of information on the target container, and the inquiring unit 330 transmits the current loading state and information on the target container to the container loading planning device 100 to inquire about the loading position of the target container. When the loading position determination unit 30 of the container loading planning device 100 determines the loading position of the target container based on the received loading state, the evaluation unit 360 of the management device 300 outputs the evaluation value for loading the target container at the determined loading position. The output unit 380 then generates and outputs the training data combining the information on the loading state and the target container, the loading position of the target container, and the evaluation values. The learning unit 220 of the server 200 learns a model by machine learning using the training data, and the output unit 240 outputs the learned model. The loading position determination unit 30 of the container loading planning device 100 then determines the loading position of the target container using the output model.

Thus, the accuracy of the model for determining the loading position can be maintained while controlling the load on the engineer.

In this exemplary embodiment, the loading container information input unit 320 of the management device 300 accepts input of information on the target container, and the inquiring unit 330 transmits the current loading state and information on the target container to the container loading planning device 100 to inquire about the loading position of the target container. Then, the evaluation unit 360 outputs the evaluation values for loading the target container at the loading position received from the container loading planning device 100, and the output unit 380 outputs the evaluation values in chronological order corresponding to the loading of the target container.

Thus, regardless of the operator's skill level, the loading position of containers can be determined appropriately, and the evaluation of the determined loading position can be sequentially ascertained.

Figure 13:
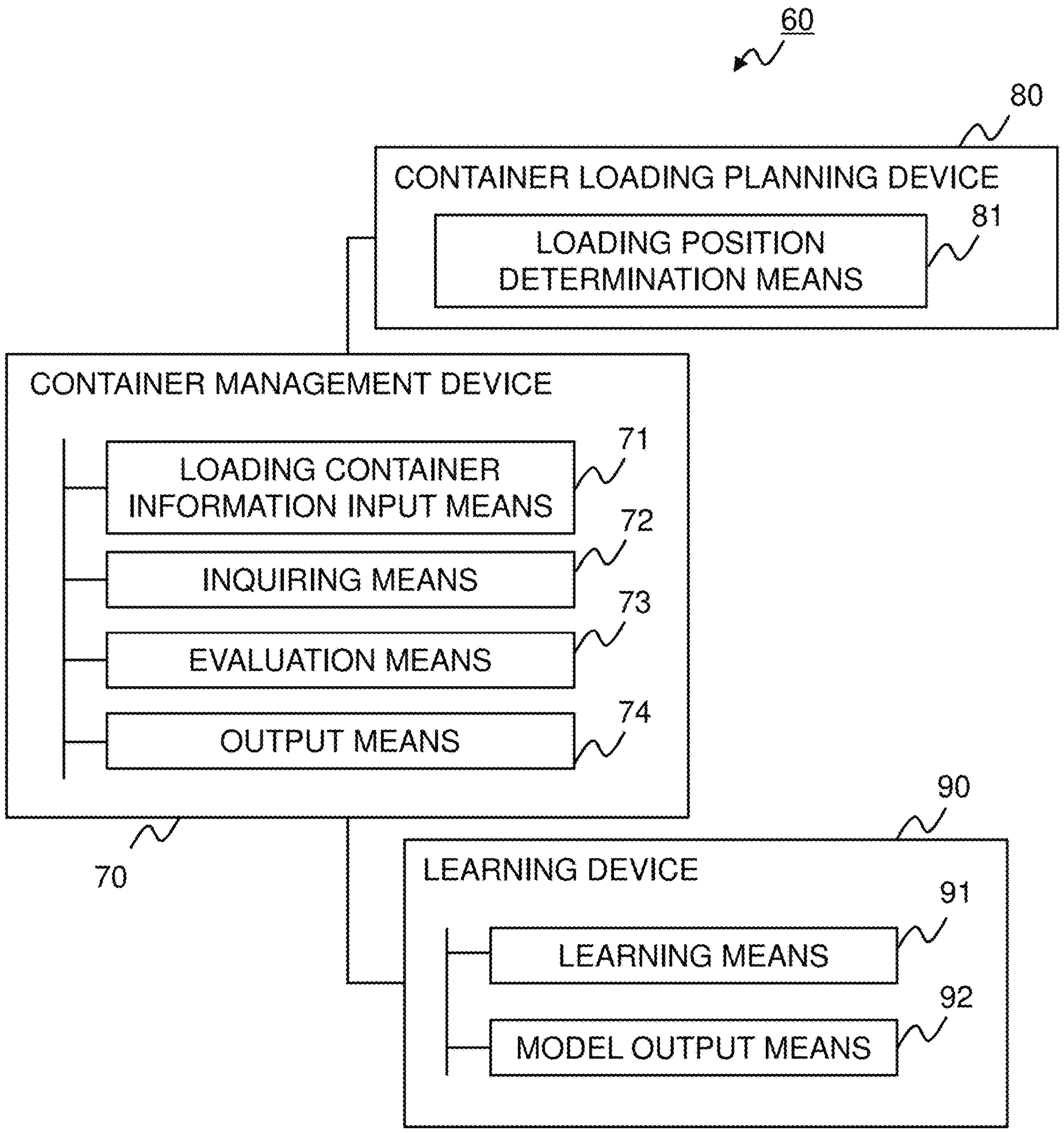
FIG. 13 It depicts a block diagram showing an overview of a container loading management system according to the present invention.

The following is an overview of the invention. FIG. 13 is a block diagram showing an overview of a container loading management system according to the present invention. The container loading management system 60 (e.g., container loading management system 1) according to the present invention includes a container management device 70 (e.g., management device 300) which manages a container to be loaded, a container loading planning device 80 (e.g., container loading planning device 100) which replies to a loading position of the container in response to an inquiry;

and a learning device 90 (e.g., server 200) which learns a model used by the container loading planning device to determine the loading position of the container.

The container management device 70 includes a loading container information input means 71 (e.g., loading container information input unit 320) which accepts input of information on the target container which is the container to be loaded next, an inquiring means 72 (e.g., inquiring unit 330) which transmits current loading state and information on the target container to the container loading planning device 80 to inquire about the loading position of the target container, an evaluation means 73 (e.g., evaluation unit 360) which outputs an evaluation value for loading the target container at the loading position received from the container loading planning device 80, and an output means 74 (e.g., output unit 380) which outputs data including the loading state and information on the target container, the loading position of the target container, and the evaluation value as training data.

The learning device 90 includes a learning means 91 (e.g., learning unit 220) which learns the model by machine learning using the output training data, and a model output means 92 (e.g., output unit 240) which outputs the learned model.

The container loading planning device 80 includes a loading position determination means 81 (e.g., loading position determination unit 30) which determines the loading position of the target container based on the loading state received from the container management device 70. Then, the loading position determination means 81 determines the loading position of the target container using the output model.

Such a configuration can maintain the accuracy of the model for determining the loading position while controlling the load on the engineer.

Specifically, the learning means 91 of the learning device 90 may learn a model (e.g., the deep learning model illustrated in FIG. 9) by deep learning using the output training data, and the model output means 92 may output a parameter of the learned model. Then, the loading position determination means 82 may determine the loading position of the target container using the model to which the output parameter is applied.

The container management device may further include a verification means (e.g., verification unit 350) which verifies validity of the loading position of the container received from the container loading planning device. Then, the evaluation means 73 may calculate the evaluation value so that the more valid the result of validity verification is, the higher the value.

The container loading planning device 80 may further include input means (e.g., input unit 10) which accepts input of a container arrival prediction, and a loading position output means (e.g., output unit 40) that outputs the determined loading position of the target container to the container management device 70. Then, the loading position determination means 81 may determine the loading position of the target container based on a policy function (e.g., $\pi(a_t|s_t)$) that calculates a selection probability of the loading position of a container assumed for the loading state of a freight car and a value function (e.g., $V_\theta(s_t)$) that calculates a value for the loading state of the freight car, which are learned based on a past loading result or a loading plan, and the value function may be calculated based on the container arrival prediction.

Such a configuration allows efficient container loading positions to be planned in real time. Therefore, since training data can also be generated in real time, it is possible to perform the learning process in parallel during business operations.

Specifically, the loading position determination means 81 may determine the loading position of the target container by a Monte Carlo tree search (e.g., the Monte Carlo tree search exemplified in FIG. 3 through FIG. 6) where a node corresponds to the loading position of a container, and by multiple trials of the loading position of the container that maximizes a value of a selection criterion (e.g., Equation 2 above) of the node including the value function and the policy function in the order of arrival of containers indicated by the container arrival prediction.

Figure 14:
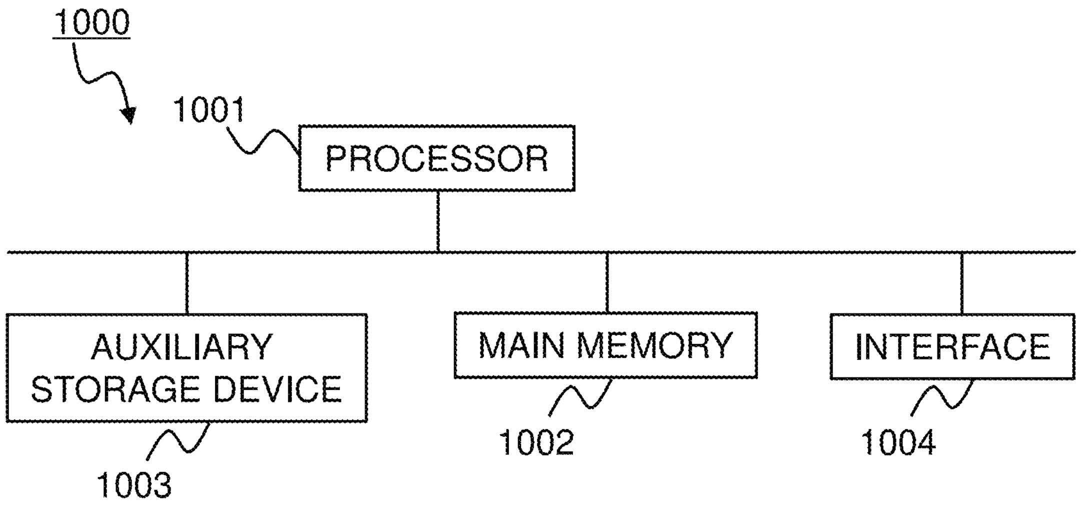
FIG. 14 It depicts a summarized block diagram showing a configuration of a computer for at least one exemplary embodiment.

FIG. 14 is a summarized block diagram showing a configuration of a computer for at least one exemplary embodiment. The computer 1000 comprises a processor 1001, a main memory 1002, an auxiliary memory 1003, and an interface 1004.

Each device in the container loading management system described above is implemented in a computer 1000. The operation of each of the above described processing parts is stored in the auxiliary storage 1003 in the form of a program. The processor 1001 reads the program from the auxiliary storage 1003, develops it to the main memory 1002, and executes the above described processing according to the program.

In at least one exemplary embodiment, the auxiliary memory 1003 is an example of a non-transitory tangible medium. Other examples of a non-transitory tangible medium include a magnetic disk, an optical magnetic disk, a CD-ROM (Compact Disc Read-only memory), a DVD-ROM (Read only memory), semiconductor memory, and the like. When the program is delivered to the computer 1000 through a communication line, the computer 1000 receiving the delivery may extract the program into the main memory 1002 and execute the above processing.

The program may be a program for realizing a part of the above described functions. Further, the program may be a so-called difference file (difference program) that realizes the aforementioned functions in combination with other programs already stored in the auxiliary memory 1003.

REFERENCE SIGNS LIST

1 Container loading management system
10 Input unit
20 Storage unit
30 Loading position determination unit
40 Output unit
100 Container loading planning device
200 Server
210 Input unit
220 Learning unit
230 Storage unit
240 Output unit
300 Management device
310 Storage unit
320 Loading container information input unit
330 Inquiring unit
340 Loading position input unit
350 Verification unit
360 Evaluation unit
370 Container prediction unit
380 Output unit

What is claimed is:

1. A container loading management system comprising:

a container management device which manages a container to be loaded;

a container loading planning device which replies to a loading position of the container in response to an inquiry; and a learning device which learns a model used by the container loading planning device to determine the loading position of the container, wherein the container management device includes:

a loading container information input means which accepts input of information on the target container which is the container to be loaded next;

an inquiring means which transmits current loading state and information on the target container to the container loading planning device to inquire about the loading position of the target container;

an evaluation means which outputs an evaluation value for loading the target container at the loading position received from the container loading planning device; and an output means which outputs data including the loading state and information on the target container, the loading position of the target container, and the evaluation value as training data, wherein the learning device includes:

a learning means which learns the model by machine learning using the output training data; and a model output means which outputs the learned model, and wherein the container loading planning device includes a loading position determination means which determines the loading position of the target container based on the loading state received from the container management device, wherein the loading position determination means determines the loading position of the target container using the output model;

wherein the learning means of the learning device learns a model by deep learning using the output training data, the model output means outputs a parameter of the learned model, and the loading position determination means determines the loading position of the target container using the model to which the output parameter is applied.

2. The container loading management system according to claim 1, wherein the container management device further includes a verification means which verifies validity of the loading position of the container received from the container loading planning device, and the evaluation means calculates the evaluation value so that the more valid the result of validity verification is, the higher the value.

3. The container loading management system according to claim 1, wherein the container loading planning device further includes:

an input means which accepts input of a container arrival prediction; and a loading position output means that outputs the determined loading position of the target container to the container management device, wherein the loading position determination means determines the loading position of the target container based on a policy function that calculates a selection probability of the loading position of a container assumed for the loading state of a freight car and a value function that calculates a value for the loading state of the freight car, which are learned based on a past loading result or a loading plan, and the value function is calculated based on the container arrival prediction.

4. The container loading management system according to claim 3, wherein the loading position determination means determines the loading position of the target container by a Monte Carlo tree search where a node corresponds to the loading position of a container, and by multiple trials of the loading position of the container that maximizes a value of a selection criterion of the node including the value function and the policy function in the order of arrival of containers indicated by the container arrival prediction.

5. A container loading management method comprising:

by a container management device which manages a container to be loaded, accepting input of information on the target container which is the container to be loaded next;

by the container management device, transmitting current loading state and information on the target container to a container loading planning device which replies to a loading position of the container in response to an inquiry, and inquiring about the loading position of the target container;

by the container loading planning device, determining the loading position of the target container based on the loading state received from the container management device;

by the container management device, outputting an evaluation value for loading the target container at the loading position received from the container loading planning device;

by the container management device, outputting data including the loading state and information on the target container, the loading position of the target container, and the evaluation value as training data;

by a learning device which learns a model used by the container loading planning device to determine the loading position of the container, learning the model by machine learning using the output training data;

by the learning device, outputting the learned model; and by the container loading planning device, determining the loading position of the target container using the output model;

wherein the method further comprises:

by the learning device, learning a model by deep learning using the output training data by the learning device, outputting a parameter of the learned model; and by the container loading planning device, determining the loading position of the target container using the model to which the output parameter is applied.

* * * * *